(12) United States Patent
Ostermann et al.

(10) Patent No.: US 10,117,384 B2
(45) Date of Patent: Nov. 6, 2018

(54) AGRICULTURAL BALER AND METHOD

(71) Applicant: Deere & Company, Moline, IL (US)

(72) Inventors: Philippe Ostermann, Dijon (FR); Juergen Gaertner, Hamm (DE)

(73) Assignee: DEERE & COMPANY, Moline, IL (US)

( * ) Notice: Subject to any disclaimer, the term of this patent is extended or adjusted under 35 U.S.C. 154(b) by 391 days.

(21) Appl. No.: 14/580,357

(22) Filed: Dec. 23, 2014

(65) Prior Publication Data

US 2015/0195994 A1 Jul. 16, 2015

(30) Foreign Application Priority Data

Jan. 13, 2014 (DE) .................. 10 2014 200 449

(51) Int. Cl.
*A01F 15/07* (2006.01)
*A01F 15/08* (2006.01)

(52) U.S. Cl.
CPC ........ *A01F 15/0715* (2013.01); *A01F 15/085* (2013.01)

(58) Field of Classification Search
CPC .... A01F 15/0715; A01F 15/02; A01F 15/046; A01F 2015/0735; A01F 2015/077; A01F 15/0825; A01F 15/0841; A01F 15/085; A01F 29/14
See application file for complete search history.

(56) References Cited

U.S. PATENT DOCUMENTS

| 2,826,985 A | 3/1958 | Harrer |
| 4,731,984 A | 3/1988 | Van Der Lely |
| 5,894,718 A * | 4/1999 | Hawlas ............... A01F 15/0841 100/88 |
| 2013/0152805 A1* | 6/2013 | Roth .................. A01F 15/0841 100/35 |

FOREIGN PATENT DOCUMENTS

| DE | 3443666 A1 | 4/1990 |
| DE | 102007031187 A1 | 1/2009 |
| DE | 102011102525 A1 | 11/2012 |
| EP | 2382858 A1 | 11/2011 |
| WO | 20110012955 A1 | 2/2011 |

OTHER PUBLICATIONS

EP Search Report dated May 27, 2015 (5 pages).
DE Search Report dated Aug. 26, 2014 (10 pages).

* cited by examiner

*Primary Examiner* — Jessica Cahill
*Assistant Examiner* — Joseph Finan, Jr.

(57) ABSTRACT

An agricultural round baler is described. The agricultural round baler comprises a holding and supplying device for crops, a pressing chamber with pressing elements for pressing the crops, and a wrapping or binding device for the wrapping or binding of a pressed round bale. In order to design a round bale production which is, as a whole, more productive, the proposal is made that it be possible for at least the pressing elements to be operated, during a wrapping or binding operation following a pressing operation, at a higher running speed than the speed during the pressing operation.

2 Claims, 5 Drawing Sheets

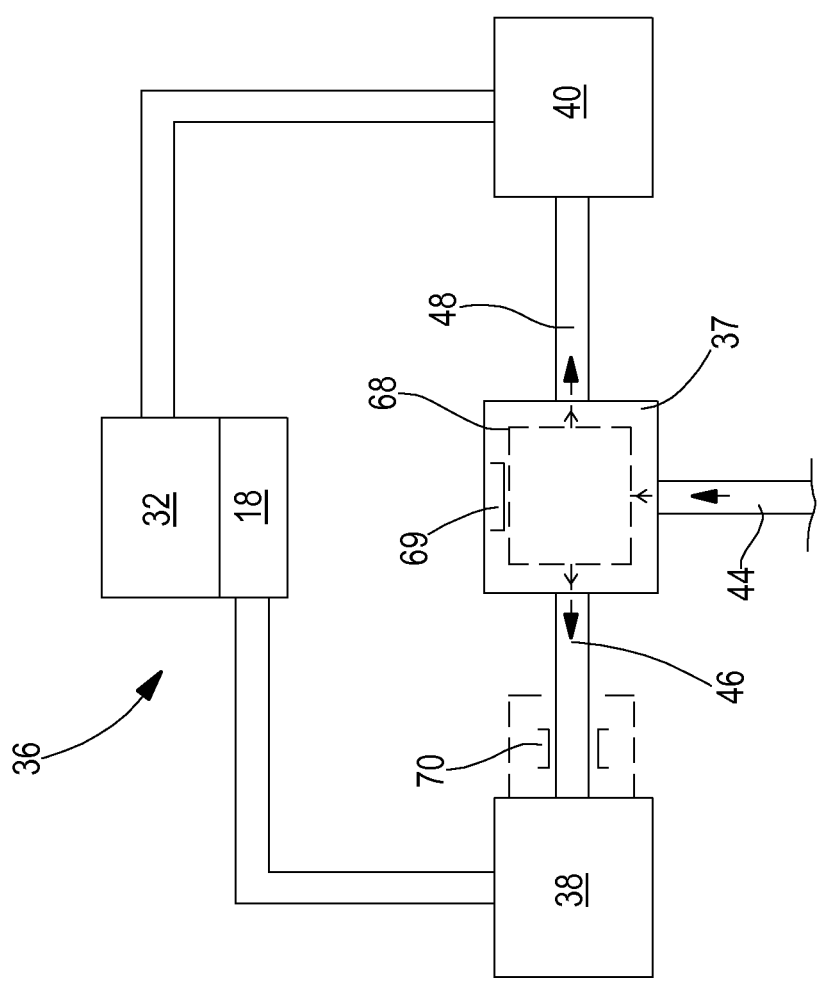

AGRICULTURAL BALER AND METHOD

CROSS-REFERENCE TO RELATED APPLICATIONS

Pursuant to 35 USC § 119, this application claims the benefit of and priority to German patent application no. 102014200449.7, filed on Jan. 13, 2014, which is herein incorporated by reference in its entirety.

FIELD OF THE DISCLOSURE

The invention concerns an agricultural round baler, with a holding and supplying device for crops, a pressing chamber with pressing elements for the pressing of crops, and a wrapping or binding device for the wrapping or binding of a pressed round bale.

BACKGROUND

Agricultural round balers are known. Via a holding and supplying unit, mowed crops, lying on the ground, are conducted into a pressing chamber of the round baler. The pressing chamber has pressing elements in the form of rollers, straps, or chain elements, via which crops conveyed into the pressing chamber are shaped, in a known manner, into a round bale. The actual pressing operation is followed by a wrapping or binding operation, in which the formed or pressed round bale is wrapped or bound with a mesh, a film, or a yarn as soon as the round bale has attained a desired or predetermined size. The holding and supplying unit and the driving of the pressing elements are generally operated via a centrally located gear, which is driven by a joint drive shaft of a towing vehicle, for example, the power-take-off shaft of a tractor or agricultural towing vehicle, or a drive shaft on a self-propelled round baler. The gear operates a first drive train for the holding and supplying device and another drive train for the pressing elements. Instead, parallel drives for each of the drive trains can be provided on the gear. The drive trains, however, can be situated in a row, one after the other, and are driven with only one driven unit of the gear. During the wrapping or binding operation, the holding and supplying of crops is generally interrupted because travelling over the field is interrupted, so the round baling process stops and additional crops are not taken up. After the wrapping or binding operation is ended, the finished round bale is ejected and travelling to take up additional crops is again undertaken so that a new pressing operation can be introduced. The entire round bale production process is, accordingly, composed of the pressing operation, the wrapping or binding operation, and the ejection of the finished round bale, wherein a not inconsiderable amount of time must be expended for the wrapping or binding operation and for the ejection of the round bale, or in other words, the work time and thus the productivity during the round bale production can be decisively influenced by the wrapping and binding operation and by the ejection.

SUMMARY

The goal that is the basis of the invention is to be found in that an agricultural round bale press of the type mentioned in the beginning is to be indicated, by means of which a productivity increase during the round bale production can be attained.

The goal in accordance with the invention is attained by the teaching of Claims 1 and 7. Other advantageous development and refinements of the invention can be deduced from the subclaims.

In accordance with the invention, an agricultural round bale press of the type mentioned in the beginning is designed in such a way that the pressing elements can be operated at a higher running speed during one of the wrapping or binding operations that follow a pressing operation than during the pressing operation itself. By operating the pressing elements at a higher running speed after the pressing operation is concluded or when the wrapping or binding operation is introduced, the round bale accordingly rotates faster during the wrapping and binding operation than it did before. In this way, the mesh or the film or the yarn is wrapped or bound around the bale at a correspondingly higher rotational speed of the round bale, wherein the wrapping or binding operation is decisively shortened. The winding or binding operation can hereby be carried out, for example, at double the running speed of the pressing elements, which can shorten the wrapping and binding operation by several seconds. This, in turn, signifies a clearly productive speeding up of the entire round bale production process.

The round baler can comprise a first drive train to drive the holding and supplying device and a second drive train to drive the pressing elements, wherein a higher running speed of the pressing elements can be attained during the wrapping or binding operation by a change of a drive transmission in the second drive train. For such a change of the drive transmission, a variable drive transmission designed with at least two switching stages can be used. Thus, for example, a two- or multiple-speed toothed wheel gear, a planetary gear, or even a variable belt drive can be used. Also, drives via an electric motor or a hydraulic motor are conceivable, which are variable in their rpm and can be situated parallel to the first drive train.

In another embodiment, the round baler can comprise a gear arrangement with a first driven unit for a first drive train to drive the holding and supplying device, and a second driven unit for a second drive train to drive the pressing elements, wherein a higher running speed of the pressing elements during the wrapping or binding operation can be attained by a change of a drive transmission in the gear arrangement or in the second drive train. Here, for example, one can proceed from a drive device in the form of a variable transfer gearbox whose drive shaft or input shaft, for example, are directly connected with the power take-off shaft of a towing vehicle and which has a first and a second driven unit in the form of a first and second output shaft, which, in accordance with the drive, provides the first or the second drive train. Then, as was already described above for the change of a drive transmission in the second drive train, the second drive train alone can be varied in accordance with the drive, so that during a wrapping or binding operation, the second drive train is driven at a higher rpm, wherein a variable transmission unit of any type, designed with at least two switching stages, is located, in accordance with the drive, behind the used transfer gearbox in the second drive train. It is possible, furthermore, to provide the used transfer gearbox with an integrated switching stage for the second driven unit, so that by means of a switching operation, the rpm of the second drive unit can be increased, whereas the first driven unit continues to run at an unchanged rpm, or in connection with the integrated switching stage or in some other way is even stopped. The change of the drive transmission in the second drive train can also be attained in that both drive trains are driven by a variable drive device in the form of a variable transfer gearbox with a first and a second driven unit, such that with the change of a drive transmission of the transfer gearbox, both the drive transmission for the first as well as for the second driven unit takes place jointly and thus an rpm increase is attained in the first as well as in the second drive train. The holding and supplying device, coupled with the first drive train, is then likewise driven at a higher rpm, which would not be advantageous with regard to wear and tear and energy loss, since the round baler is stopped during the wrapping or binding operation and thus the holding and supplying device runs on site without being productive. In the overall consideration for such a combined arrangement of the drives for the first and second drive trains, this alternative, however, can also prove to be low-cost and thus, in the end effect, also more economical, since the gear arrangement itself is possibly constructed in a simpler manner and at a lower cost. In order to avoid driving the two drive trains at a higher rpm, a coupling, for example, can also be provided, which, on the driven side of the first driven unit, is provided in the first drive train, and in the case of an overall increase of the number of gears for the gear arrangement it is opened so as to decouple the first drive train at an increased rpm from the first driven unit, so that although the first driven unit is likewise operated at an increased rpm, the first drive train, which can be coupled thereon, is decoupled from it.

The aforementioned gear arrangement can be designed as a planetary gear, which, for example, has a drive via a sun wheel, a first driven unit via a ring wheel, and a second driven gear via a planetary carrier of the planetary gear, wherein a changeable drive transmission can be attained by blocking or braking a driven unit component. As a driven unit component, one can, for example, use the ring wheel or the planetary carrier of the planetary gear if the drive is carried out via the sun wheel. For example, by blocking or braking the ring wheel, which can be connected with the first drive train, the second driven unit, which is connected with the planetary carrier, can be operated in a drive transmission at a higher rpm during the wrapping or binding operation. Depending on the design of the drive and driven unit conditions or specifications for the round baler, the drive and driven units can also be placed in another arrangement on the planetary gear. Independent of the blocking or braking of a driven unit component of the planetary gear, the possibility exists here, as well as in other combination examples, of decoupling the first drive train during a wrapping or binding operation by the placement of a coupling from the first driven train, so that the holding and supplying unit is not operated or is stopped during the wrapping or binding operation.

Furthermore, it is possible for the gear arrangement to comprise a differential gear with a differential lock, wherein a changeable drive transmission can be attained by cancelling the differential lock in connection with a drive lock or a drive brake on the first drive unit or on the first drive train. The drive lock or the drive brake can be located thereby within a differential gear housing or also outside the differential gear housing. By the shape and design of a differential lock in the differential gear, which are, in fact, known, the first and second driven units can be brought directly in connection with one another by activating the differential lock, wherein a differential movement between the first and second drive units is stopped or blocked. With an activated differential lock, there is a uniform and simultaneous output via the two driven units. In just the opposite manner, the direct connection between the first and the second driven units can be cancelled by deactivation or loosening of the differential lock, so that differential movements are permitted. With a deactivated differential lock, it is possible to absorb a differential movement of the two driven units, that is, different rpms, with the differential gear so that, for example, one of the driven units can be blocked or braked, whereas the other driven unit continues to rotate at a changed rpm. Thus, for example, by blocking or braking the first drive connection or the thus connected first driven unit, a change of the drive transmission for the second drive train can be attained if the differential lock is simultaneously cancelled or deactivated.

Furthermore, a method for the production of round bales with an agricultural round baler is proposed, which is the basis for the embodiments described above, wherein, following a pressing operation, at least the pressing elements are operated at a higher running speed during a wrapping or binding operation than the speed of the pressing operation.

With the aid of the drawing, which shows an embodiment example of the invention, the invention and additional advantages and advantageous refinements and developments are described in more detail and explained below.

BRIEF DESCRIPTION OF THE DRAWINGS

The figures show the following:

FIG. 5, a schematic diagram for another embodiment of a drive arrangement for a round baler in accordance with FIG. 1, with a gear arrangement with a differential gear.

DETAILED DESCRIPTION

Figure 1:
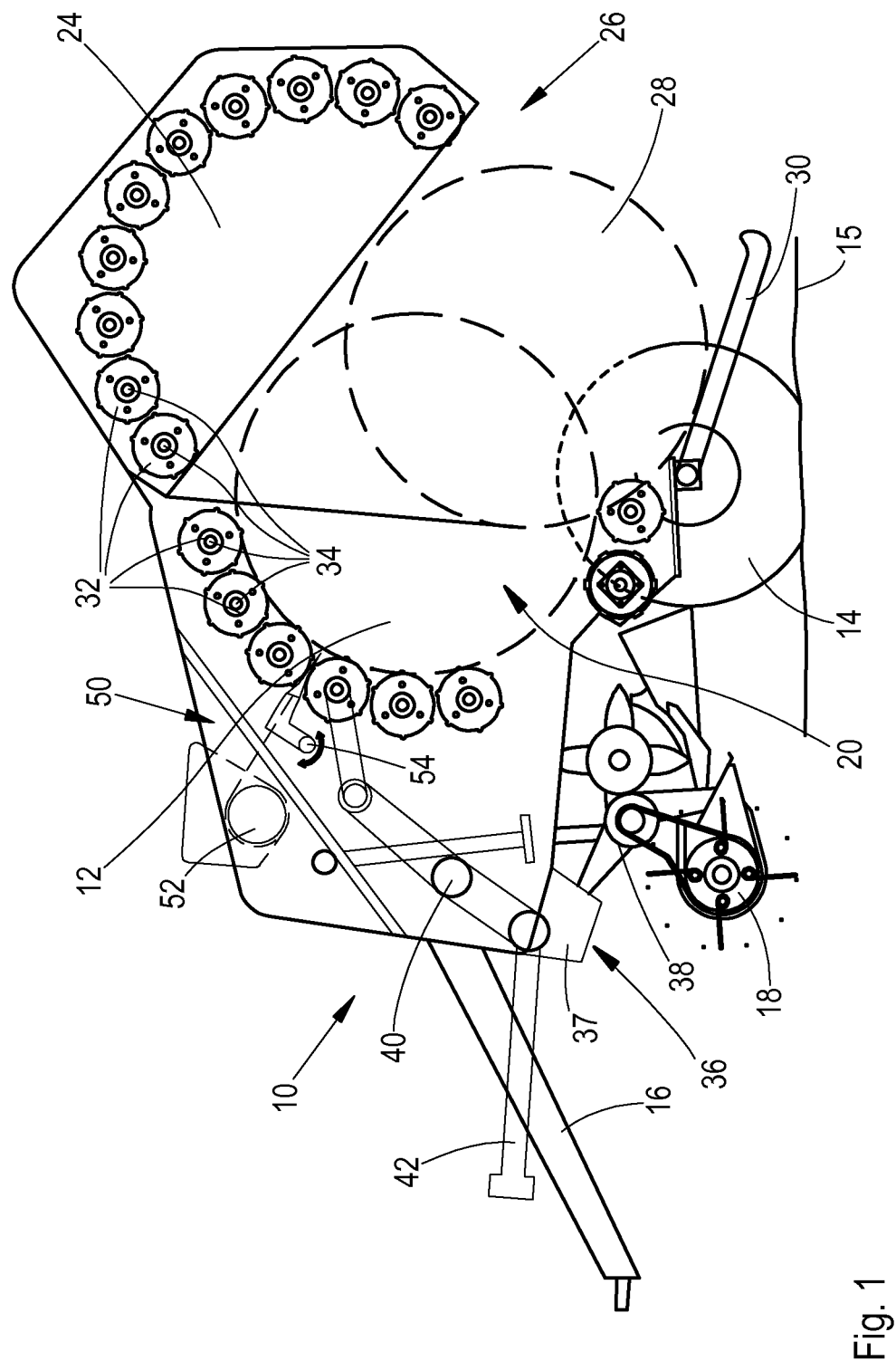
FIG. 1, a schematic lateral view of a round baler.

A round baler 10, schematically shown in FIG. 1, comprises a first housing part 12, which is supported on a base 15 by means of wheels 14, and which can be connected by means of a towing bar 16 to a towing vehicle (not depicted), for example, a farm tractor.

On the front, lower side of the first housing part 12, in the forward direction, there is situated, in a known manner, a holding and supplying device 18 for crops, and the front part of a baler space 20 is formed in the first housing part 12. On the rear, upper corner area of the first housing part 12, is situated a support 22 for a swiveling second housing part 24, which surrounds a rear part of the baler space 20. The second housing part 24 uncovers, when open, an outlet 26, by means of which a bale 28, pressed by the round baler, can be deposited or unloaded. The swiveling second housing part 24 can be actuated (opened and closed) by means of servomotors (not depicted) and is a discharge chute for a bale 28 pressed in the baler space 20. The bale 28 is thereby moved in the direction of the outlet 26 and thereby rolls onto a rolling-off or unloading ramp 30, via which the bale 28 can be conducted to the ground 15.

The round baler 10, designed with a size-changing baler space 20, contains a number of pressing elements, running parallel to one another, to press crops in the shape of pressing rollers 32 (by way of example, only a few pressing rollers 32 were provided with the reference symbol "32" here), whose rotation axes 34 are placed, with a closed second housing part 24, on a circular arc, and of which at least a few are driven. Alternatively, the round baler 10 can also be designed in a known manner as such, with a size-changing baler space 20 or as a baler with a variable baler 20, wherein the pressing elements can then likewise be designed in a known manner as belts, straps, or chain arrangements (not depicted).

The round baler 10 also has a drive arrangement 36 with a gear arrangement 37, a first drive train 38, and a second drive train 40. A drive shaft 42 can be connected with a power take-off shaft (not depicted) of the towing vehicle or tractor and serves as a drive 44 for the drive arrangement 36. The first drive train 38 is connected, via a first drive unit 46, and the second drive train 40 is connected, via a second driven unit 48 of the gear arrangement 37, with it in the drive connection. The first drive train 38 drives the holding and supplying device 18, wherein the second drive train 40 is provided to drive the pressing rollers 32. The drive trains 38, 40 comprise all drive components which are situated in a known manner in round balers to drive the holding and supplying device 18 or to drive the pressing elements and, on the drive side, are connected with the first drive unit 46 or the second driven unit 48 of the gear arrangement 37.

Furthermore, the round baler 10 comprises a wrapping device 50, which is equipped with a mesh or film roll 52 as a wrapping material. The wrapping device 50 comprises a wrapping material supply 54, which conducts the wrapping material from the mesh or film roll 52 into the baler space 20. Instead of a wrapping device 50, a binding device (not depicted) with binding yarn can also be used, likewise in a known manner.

During a normal pressing operation, the first and the second drive trains 38, 40 are driven in parallel via the gear arrangement 37 or via the drive 44 and the driven units 46, 48, so that the holding and supplying device 18 and also the pressing elements 32 are maintained in operation at the same time and at a constant rpm ratio. After the actual pressing operation, that is, the take up of the crops and the formation of the round bale 28 by the pressing rollers 32 has been concluded, travelling over the ground 15 is interrupted, since the round baler 10 is filled with the round bale 28 and no more crops are to be taken up or can be taken up in the baler space 20. At this time, the wrapping device 50 is also activated and a wrapping or binding operation is introduced following the pressing operation. The wrapping material is thereby wrapped around the round bale 20 by a continuous rotation of the round bale found in the baler space 20. After a wrapping operation has been concluded, the round bale is released to the ground 15 via the unloading ramp 30, by opening the discharge chute 24. Then, travelling with the round baler 10 is again taken up and a new pressing operation begins. The rpm of the holding and supplying device 18 is usually constant during the picking up of the crops, and the travelling speed of the round baler 10 is adapted so as not to pick up too large nor too small an amount of crops for an optimal crop pickup. The crop pickup is, moreover, also limited by construction features of the press and by the dimensions of a crop inlet. In other words, the holding and supplying device 18 cannot convey crops at an arbitrarily fast rate, since the result could be clogging of the conveying channel of the round baler 10. Nevertheless, in order to increase the productivity of the round baler 10 in comparison to traditional balers, it is possible in the case of the round baler 10 designed here to operate the pressing elements or pressing rollers 32 at higher running speeds during the wrapping or binding operation. If we are dealing with a round baler 10 with a variable baler space 20, the belts, straps, or chain arrangements would be correspondingly operated at a higher running speed. The result would be that during the wrapping or binding operation, the finished round bale 20 is turned or rotated at a higher speed in comparison to the speed of the pressing operation. In this way, the wrapping or binding material is also wrapped more quickly around the round bale 20 and the wrapping or binding operation can be clearly shortened. Thus, the round bale 20 can also be let out or deposited earlier. In other words, the downtime of the round baler 10 when not travelling over the ground 15 is clearly shortened and the productivity is thus increased. In this way, more round bales 20 per unit time can be moved in.

In order to now make possible a higher running speed of the pressing elements during a wrapping or binding operation following a pressing operation, various embodiment examples are proposed, which are described in the following, with the aid of schematic representations of the drive arrangement 36 in FIGS. 2-5.

Figure 2:
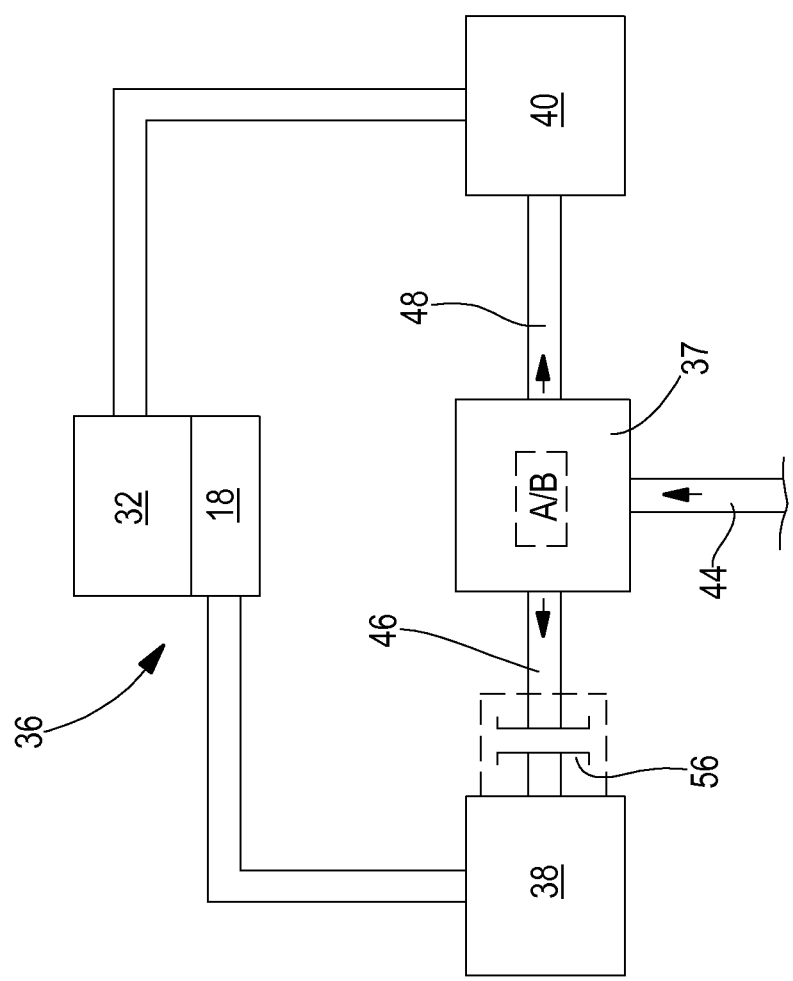
FIG. 2, a schematic diagram for another embodiment of a drive arrangement for a round baler in accordance with FIG. 1, with a gear arrangement with a transfer gearbox.

In a first embodiment example, see FIG. 2, the round baler 10 is operated with a first drive train 38 to drive the holding and supplying device 18, and a second drive train 40 to drive the pressing elements, wherein a higher running speed of the pressing elements can be attained during the wrapping or binding operation by a change of the rpm of the second drive train 40. To this end, the gear arrangement 37 is designed in a first switching stage with a low transmission (A), and in another switching stage with a higher transmission (B) for the first and second driven units 46, 48. Thus, after the pressing operation, switching to the second switching stage can be carried out, and the pressing rollers 32 are operated at a higher speed. Since the first and the second drive trains 38, 40 or the first and the second driven units 46, 48 are operated in the fixed rpm ratio, the holding and supplying device 18 also turns at a correspondingly higher speed. This is, however, not significant for the round bale-forming process, since the round baler is stationary and does not travel over the ground. After the wrapping or binding process has concluded, the gear arrangement 37 can again be switched to the switching stage with the lower transmission. The switching can take place in a known manner with electric or hydraulic servomotors. Furthermore, a coupling 56 can additionally be provided in the first drive train 38 or on the first driven unit 46, by means of which the first drive train can be decoupled from the first driven unit 46 of the gear arrangement 37 during the wrapping or binding operation. In this way, the wear and tear of the holding and supplying device 18 can be decisively reduced, since it need not also run during the wrapping or binding operation.

Figure 3:
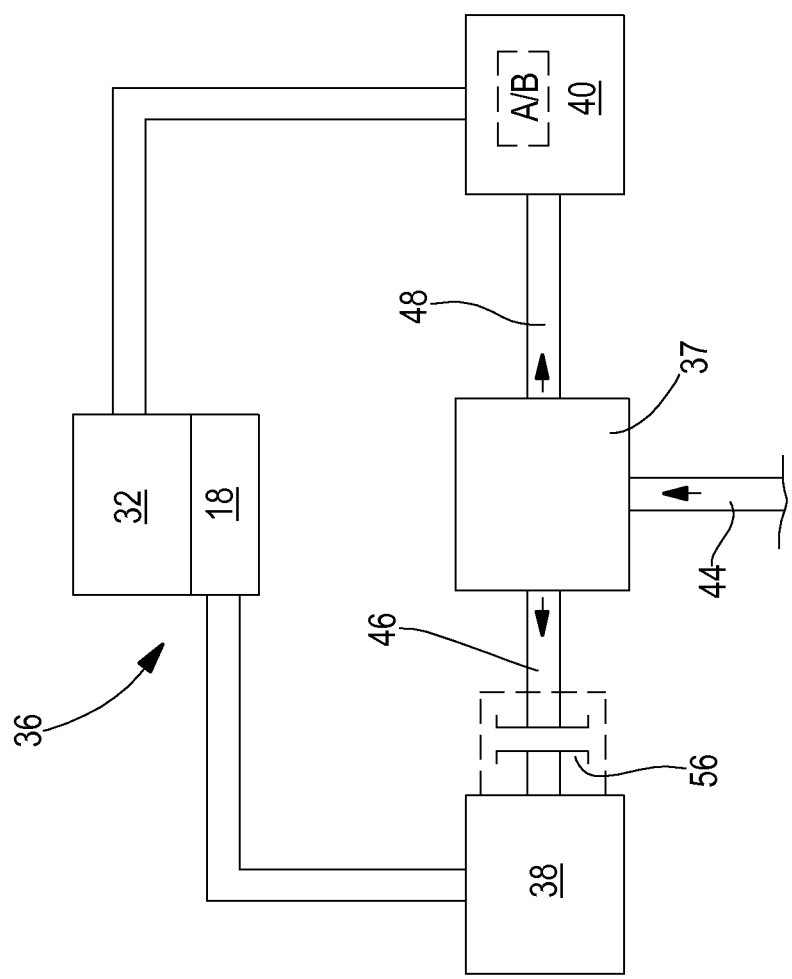
FIG. 3, a schematic diagram for another embodiment of a drive arrangement for a round baler in accordance with FIG. 1, with a gear arrangement with transfer gearboxes and a transmission stage in a drive train.

In another embodiment example, see FIG. 3, the gear arrangement 37 is designed as a constant transfer gearbox, without switching stages. Instead, a switching stage with a lower transmission and another switching stage with a high transmission (A/B) are provided in the second drive train 40, so that in the low switching stage, the first and the second drive trains 38, 40 are driven at the same rpm; on the other hand, in the high transmission, the second drive train 40 can be operated at a higher rpm in comparison to the first drive train 38. Thus, after the pressing operation, switching to the second switching stage can be carried out for the second drive train 40, and the pressing rollers 32 are operated at a higher speed, where it should be mentioned here that the first drive train 38 is then not operated at a higher speed. As for the rest, the embodiment example in FIG. 3 is similar to the embodiment example in FIG. 2. Furthermore, for the reasons mentioned above, it is also possible to provide a coupling 56 in the first drive train 38 or on the first driven unit 46, in order to adjust the operation of the first drive train 38 during the wrapping or binding operation.

Figure 4:
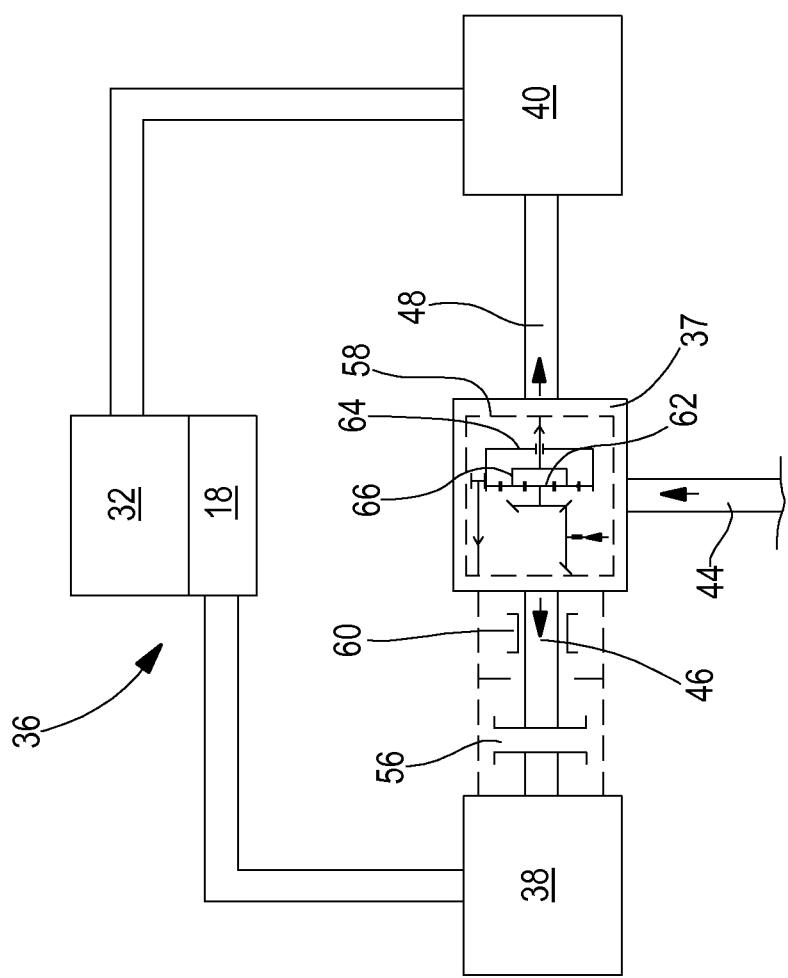
FIG. 4, a schematic diagram for another embodiment of a drive arrangement for a round baler in accordance with FIG. 1, with a gear arrangement with planetary gears.

In another embodiment example, see FIG. 4, the gear arrangement 37 comprises a planetary gear 58 in combination with a lock or braking device 60. The planetary gear 58 is designed in such a way that a sun wheel 62 is connected with the drive 44, and the first driven unit 46 is operated via a ring wheel 64, and the second driven unit 48, via a planetary carrier 66. The lock or braking device 60 is connected with the first driven unit 46 in the embodiment example shown in FIG. 4, wherein the ring wheel 64 can be locked or braked. With a locked or braked ring wheel 64, the rpm of the planetary carrier 66 is increased, so that the first drive train 38 is stopped or operated at a lower rpm and, simultaneously, the second drive train 40 is operated with a correspondingly higher rpm. The lock or braking device 60 can alternatively also be located in the first drive train 38 or directly on the ring wheel 64. As described also for the preceding embodiment example, it is possible here to decouple the first drive train 38 from the first driven unit 46 during a wrapping or binding operation by the placement of a coupling 56, so that the holding and supplying device 18 is not operated or is stopped during the wrapping or binding operation. In such a case, the lock or braking device 60 would be located between the planetary gear 58 and the first drive train 38.

In another embodiment example, see FIG. 5, the gear arrangement 37 comprises a differential gear 68 with an integrated differential lock 69, in combination with a lock or braking device 70 for the first drive train 38 or the first driven unit 46. The differential gear 68 is designed in such a manner that with an activated differential lock 69 in a type and manner which are known for a differential gear 68, a uniform drive distribution is carried out to the first and second driven units 46, 48. With a deactivated differential lock 69, corresponding to a type and manner likewise known for a differential gear, which is aimed at the driven unit torques or driven units rpm acting on the driven units 46, 48, so that, for example, with a first drive train 38 or the first driven unit 46, blocked by the lock or the braking device 70, a drive flow takes place, as a whole or increased, via the second drive train 40 or the second driven unit 48, at a correspondingly higher rpm. Accordingly, the lock or braking device 70 in the embodiment example shown in FIG. 5 is connected with the first driven unit 46 or with the first drive train 38.

Even if the invention was described with the aid of only a few selected embodiment examples, many diverse alternatives, modifications, and variants that fall under the invention under consideration become accessible for the specialist in light of the preceding description and the drawing.

The invention claimed is:
1. An agricultural round baler comprising:
a holding and supplying device for crops;
a pressing chamber with pressing elements for the pressing of crops;
a wrapping or binding device for the wrapping or binding of a pressed round bale;
a first drive train for driving the holding and supplying device;
a second drive train for driving the pressing elements;
a gear arrangement coupled to a power-take-off shaft to receive input power, the gear arrangement coupled to the first drive train to drive the holding and supplying device, and the gear arrangement coupled to the second drive train to drive the pressing elements; and
a braking device coupled to one of the first drive train and a first driven unit, the braking device configured to selectively brake the first drive train;
wherein the gear arrangement comprises a differential gear with a differential lock;
wherein the gear arrangement includes a first switching stage in which the differential lock is activated and directly connects the first and second drive trains with one another to operate the second drive train at a first speed, and a second switching stage in which the differential lock is deactivated and the braking device brakes the first drive train to operate the second drive train at a second speed which is higher than the first speed; and
wherein during a wrapping or binding operation, the drive transmission is in the second switching stage operating the second drive train at the second speed which causes the pressing elements to operate at a higher running speed.
2. The agricultural round baler of claim 1, comprising:
a coupling positioned between the gear arrangement and the holding and supplying device, the coupling configured to decouple the holding and supplying device from the gear arrangement during the wrapping or binding operation.

* * * * *